United States Patent Office 3,520,384
Patented July 14, 1970

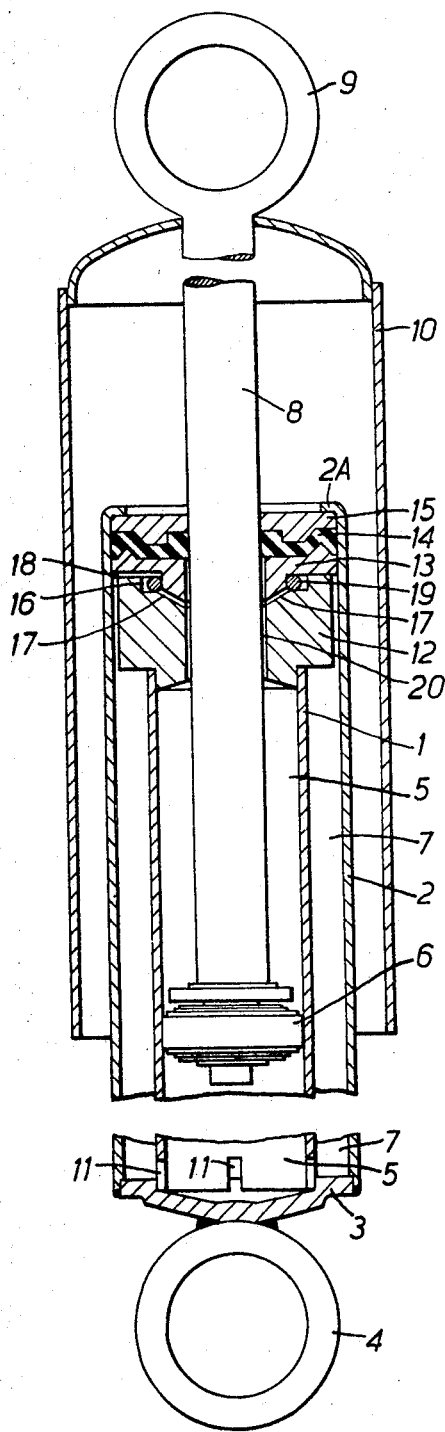

3,520,384
HYDRAULIC DAMPER WITH ONE-WAY VALVED
BY-PASS IN CYLINDER HEAD
Lawrence George Nicholls, Tyseley, Birmingham, England, assignor to Girling Limited
Filed Oct. 7, 1968, Ser. No. 765,459
Claims priority, application Great Britain, Oct. 17, 1967, 47,192/67
Int. Cl. F16f 9/34
U.S. Cl. 188—88                                    3 Claims

ABSTRACT OF THE DISCLOSURE

A telescopic vibration damper comprising a cylinder containing hydraulic fluid, in which works a piston whose rod extends out through the upper end of the cylinder, and an outer tube surrounding the cylinder and forming a reservoir whose lower part communicates with the lower end of the cylinder and also contains hydraulic fluid, while its upper part contains gas under pressure, has closure means at the upper end of the cylinder formed with a passage for the return to the reservoir of any gas that may collect in the cylinder, the passage being controlled by a one-way valve.

---

This invention relates to telescopic vibration dampers such as are used in vehicle suspension systems.

It has already been proposed to construct such a damper with a cylinder containing hydraulic fluid, in which works a piston whose rod extends out through the upper end of the cylinder, and an outer tube surrounding the cylinder and forming a reservoir whose lower part also contains hydraulic fluid and is in communication with the lower end of the cylinder, while its upper part contains gas under pressure and communicates with the upper end of the cylinder through means which permit fluid to flow from the cylinder to the reservoir, but not from the reservoir to the cylinder.

The present invention provides an improved form of one-way valve for a damper of the above described character and in accordance with the invention the closure means at the upper end of the cylinder, through which the piston rod passes slidably, are formed with a recess communicating with the upper part of the reservoir and also communicating with the upper end of the cylinder through one or more passages extending inwardly from the recess to a passage defined by the rod and the closure means and a valve closure element housed in the said recess, the said element being resiliently biased to close the adjacent end of the inwardly extending passage or passages and movable under excess pressure in the cylinder to permit one-way flow.

A particular and at present preferred embodiment of the invention is described below with reference to the accompanying drawing which shows in axial cross-section a damper constructed in accordance with the invention and shown in its usual operating attitude.

The damper shown comprises inner and outer concentric tubes 1 and 2 whose lower ends are closed and secured together by an end cap 3 carrying a ferrule 4, by which the damper may be connected to the unsprung mass of a vehicle. The tubes 1 and 2 define a cylinder space 5, in which works a valved piston 6, and a reservoir space 7. The piston is attached to the lower end of a rod 8 whose upper end carries a ferrule 9, by which the damper may be connected to the sprung mass of a vehicle, and a depending tubular dirt shield 10. The lower ends of the cylinder and reservoir spaces communicate with one another through orifices 11, formed by slotting the inner tube 1.

At the upper end of the cylinder the piston rod 8 passes slidably through four annular members, namely a guide 12, seal support 13, seal 14 and retainer 15, fitted within the upper end of the outer tube 2 and held in the superimposed relation shown between the upper end of the inner tube 1 and the inturned end 2a. The seal 14 is of elastomeric material and is held axially compressed so as to be deformed into film sealing engagement with the outer tube 2 and the piston rod 8.

The adjacent faces of the guide 12 and seal support 13 are so shaped as to define between them an annular recess 16 and a number of passages 17, extending inwardly from the recess to the central bore through which the piston rod 8 passes, a clearance forming a narrow annular passage 20 between the rod and the bore of guide 12 affording communication with the upper end of the cylinder space 5. Also formed between the surfaces of members 12 and 13 are one or more passages 18 which (through the clearance between the guide 12 and the outer tube 2) afford communication between the recess 16 and the upper end of reservoir space 7. An O-ring 19 of rubber or other elastomeric material is accommodated in elastically stretched condition with the recess 16 so as normally to be held elastically contracted over the mouths of the passages 17, to seal the same.

The cylinder space 5, both above and below the piston 6 is normally completely filled with hydraulic fluid and the lower part of the reservoir space 7 also contains hydraulic fluid, the upper part of this space containing air or other gas at a pressure of, say, 20 atmospheres. In operation, movement of the piston rod relative to the tubes 1 and 2 is damped by the resistance to fluid flow afforded by the piston valving. During contraction of the damper, the increased displacement of the piston rod forces fluid from the cylinder through apertures 11 into the reservoir 7, the gas providing the requisite yielding resistance to flow of fluid and obviating the need to provide a valve or valves for that purpose.

Transfer of gas into the upper part of cylinder space 1 through the passages 17 is prevented by O-ring 19 sealing those passages. Should a pocket of gas be formed at the upper end of the cylinder, as may happen, for example, if the damper is inverted during transport or storage, or by gas coming out of solution in the hydraulic fluid during operation of the damper, subsequent operation of the damper will pump this gas back into the reservoir through the one-way valve constituted by the O-ring. The resistance to liquid flow through this one-way valve by way of the restricted passages which communicate through the valve is significantly greater than the resistance offered by the valving of piston 6, thus ensuring that the piston valving will be effective during normal operation of the damper.

Among the advantages of the above described arrangements are the fact that the valve closure member cooperates with a fixed seating part (12, 13) rather than against a movable part such as the piston rod, and the fact that the passages 17 lead to the narrow clearance passage 20, which acts as a throttling restriction, protects the valve member 19 from the full pressure in the cylinder.

I claim:
1. In a telescopic damper comprising: a cylinder containing hydraulic fluid; a valved piston working in the cylinder; a piston rod secured to the piston and extending out through the upper end of the cylinder; and an outer tube surrounding and secured to the cylinder and defining therewith a reservoir whose lower part communicates with the lower end of the cylinder and also contains hydraulic liquid and whose upper part contains gas under pressure; the improvement which comprises:

closure means comprising an annular rod guide closing the upper end of the cylinder and fitting within the outer tube, said rod guide being formed with a bore through which the piston rod extends and a second annular member whose lower surface engages the upper surface of the rod guide, the engaging surfaces of the rod guide and second annular member being shaped to define a recess communicating with the upper part of the reservoir, and a passage extending inwardly from the recess into the cylinder; and a stretched ring of elastomeric material in the recess forming a one-way valve for the passage of fluid from the cylinder to the reservoir.

2. The improved damper of claim 1 wherein the annular rod guide fits within the outer tube with clearance, and the piston rod extends through the rod guide with clearance.

3. The improved damper of claim 1 wherein an annular seal of elastomeric material is provided above the said second annular member in sealing engagement at its inner and outer peripheries with the piston rod and the outer tube respectively.

References Cited

FOREIGN PATENTS

| 1,198,818 | 6/1959 | France. |
| 1,382,183 | 11/1964 | France. |
| 785,056 | 10/1957 | Great Britain. |
| 821,030 | 9/1959 | Great Britain. |
| 138,624 | 12/1952 | Sweden. |

GEORGE E. A. HALVOSA, Primary Examiner

U.S. Cl. X.R.

188—97, 100